Patented May 2, 1950

2,506,316

UNITED STATES PATENT OFFICE 2,506,316

FORMING HYDROGEL BEADS BY SPRAY CONTACT

Jerry A. Pierce, Baton Rouge, La., assignor to Standard Oil Development Company, a corporation of Delaware No Drawing. Application May 14, 1945, Serial No. 593,770

8 Claims. (Cl. 252—448)

This invention relates to a process for the preparation of gel particles having diameters below 1 mm. and it relates more particularly to the preparation of microspherical gel particles.

Inorganic gels are well known and have been long used for various purposes, for example, for the adsorption of condensible vapors from gaseous carriers and for catalytic purposes either as the catalyst itself or as a component thereof, or as a carrier. The most widely used of these inorganic gels in the dried condition is that of silica with or without the addition of other gelatinous materials such as alumina.

Such gels have been found to be particularly useful as catalysts for carrying out reactions involving hydrocarbons and particularly in the so-called fluid catalyst process in which the catalyst is in a powdered form and is aerated or fluidized by means of a gas so that it acquires the properties of a liquid, such as fluid flow, hydrostatic pressure, and the like. The hydrostatic pressure property of these powdered catalysts is made use of in circulating the powdered catalyst through the system. These powdered catalysts are generally prepared by grinding silica gel or other types of gel catalysts to the desired size. It has recently been found that gel particles prepared in the form of spheres having diameters less than 1 mm. are particularly suited to use in the fluid catalyst process. Due to their spherical shape such catalyst particles are more easily fluidized and are subject to less attrition in use. These microspherical particles may be prepared by dispersing a sol in a non-completely water-miscible liquid, such as oil or normal butanol. However, these methods require complicated apparatus, particularly for continuous operation.

It is known that minute gel particles can be formed by spraying a sol in heated air but this procedure requires equipment for mixing the sol as well as spraying. In addition this procedure cannot be used wherein extremely fast setting sols are employed because the spraying equipment becomes plugged.

It is therefore the main object of this invention to prepare microspherical catalyst particles in a more simple and economical manner.

It is a further object of this invention to provide a method for preparing microspherical catalyst particles by spraying which avoids the plugging of the spraying equipment.

It is a still further object of this invention to provide a method of preparing spherical catalysts which is particularly adapted to fast setting sols.

According to one embodiment of this invention these and other objects of this invention are accomplished by mixing separate sprays of the individual sol-forming components in a suitable atmosphere and collecting the particles of microhydrogel spheres formed in such a manner as to avoid deformation. The process is applicable to the formation of simple gels or plural gels. In the first case a salt, such as sodium silicate, is sprayed into a separate spray of an acid such as sulfuric to form the sol which immediately sets to a hydrogel. In the second case sprays of two salt solutions are mixed to form a plural sol which in turn sets to a plural gel. The atmosphere into which the sol-forming components are sprayed may be ordinary air or it may be nitrogen, steam, ammonia, vapors of organic compounds, such as hydrocarbons or oil vapors, vapors of normal butanol and other alcohols, such as isopropyl alcohol, vapors of acetic acid or other organic acids, vapors of other organic compounds, such as morpholine, mineral acid vapors, such as hydrochloric acid, etc. The choice of an atmosphere depends upon the type of gel to be formed. For example, in the preparation of alumina gel it is preferable to spray the sol components into an alkaline atmosphere so as to facilitate the setting. The spheres are collected, preferably, by dropping into non-completely water-miscible organic compounds, particularly those having a density less than those of the spheres, such as light oils, normal butanol, etc. However, the spheres may also be collected as a slurry in water or in an aqueous solution of a water-soluble compound. Furthermore, instead of mixing two sprays of sol-forming components, it is within the scope of this invention to spray one of the sol-forming components with a solution of the other with constant stirring.

It is another feature of this invention to mix the individual sprays to form sols in spherical form in a gaseous atmosphere located above a liquid which may contain a surface active agent. For example, morpholine, diglycol oleate, and other desirable emulsifiers may be added to water, alcohol, mineral oil or other collecting liquid. Alternatively the individual sol-forming components may be sprayed together beneath a suitable liquid such as mineral oil or butanol.

The spherical sol particles enter the liquid which may be tempered by heat and may be circulating; the motion of the liquid is controlled so as to keep the formed sol particles in suspension while the sol sets to a firm gel.

In cases where the sol formation, spherification and gelation are accomplished essentially simultaneously the gel particles are collected by settling on a surface which of course may be moving in order that the process may be continuous.

Thus this invention embodies means for avoiding complicated and expensive equipment for preparing gels from fast setting as well as slow setting sols.

The hydrogel spheres collected may be dried in any suitable manner. The atmosphere may be heated so that the hydrogel is partially dehydrated as formed. The hydrogel particles may be further dried in air, or in the presence of a water-immiscible liquid, such as mineral oil or a partially water-miscible liquid, such as normal butanol, or if desired, in the presence of a completely water-miscible liquid, such as isopropyl alcohol. The use of mineral oil or normal butanol or isopropyl alcohol as a drying medium prevents the particles from agglomerating. Furthermore, the activity and stability to steam and heat are increased by these methods of drying.

The following examples illustrate the preparation of spherical gel catalysts according to this invention.

*Example 1*

A solution of sodium silicate of about 40° Bé. was sprayed into air by means of an ordinary painter's spray gun operating under an air pressure of from 40 to 80 pounds. When this spray was mixed with a similar spray of a 30% solution of $AlCl_3.6H_2O$, microscopic globules of silica-alumina hydrogel were essentially instantaneously formed.

*Example 2*

This example was carried out in a similar manner to Example 1, except that instead of mixing the spray of sodium silicate with a spray of aluminum chloride, the sodium silicate was sprayed into air and dropped into a solution of the aluminum chloride with constant stirring. In this case the spheres settled to the bottom as formed.

*Example 3*

In the same manner as in Example 1 silica hydrogel spheres were prepared by mixing a spray of 25° Bé. sodium silicate with a spray of 23° Bé. sulfuric acid and collecting the spheres as a slurry in water.

Similar experiments were also carried out in which the spheres were collected in normal butanol and in mineral seal oil with and without the addition of morpholine.

From the above examples it is clear that microspherical gel particles can be prepared which can be used in the fluid catalyst process without further grinding, since the method described of forming hydrogel spheres by spraying into air or other atmosphere and subsequently collecting the particles in a suitable liquid results in the formation of particles which, when dried, retain in general their original discrete form and do not tend to form larger aggregates.

The nature and objects of the present invention having thus been fully set forth and specific examples of the same given, what is claimed as new and useful and desired to be obtained by Letters Patent is:

1. Process for preparing minute spherical inorganic hydrogel particles from separate solutions of at least two different sol-forming constituents which comprises mixing separate sprays of the said solutions whereby sol particles are formed in disperse phase, conducting the particles thus formed, by gravity flow through a body of liquid during the time required to gel the said particles, and collecting and separating said gelled particles from the said body of liquid.

2. A process according to claim 1 in which the body of liquid is an aqueous liquid.

3. Process according to claim 1 in which the liquid is butanol.

4. Process according to claim 1 in which the liquid is mineral oil.

5. Process for preparing minute spherical inorganic hydrogel particles from separate solutions of at least two different sol-forming constituents which comprises mixing separate sprays of the said solutions whereby sol particles are formed in disperse phase, maintaining the resulting sol particles in disperse phase for a sufficient period of time to effect gelation, and collecting the hydrogel spheres formed.

6. Process for preparing minute spherical particles of silica hydrogel which comprises mixing separate sprays of sodium silicate solution and of sulfuric acid, maintaining the resulting particles of silica sol in disperse phase for a sufficient period of time to effect gelation and collecting the silica hydrogel spheres formed.

7. Process for preparing minute particles of silica-alumina hydrogel which comprises mixing separate sprays of sodium silicate solution and of a solution of an aluminum salt, maintaining the resulting sol particles in disperse phase for a sufficient period of time to effect gelation and collecting the resulting spheres of silica alumina hydrogel.

8. Process according to claim 7 in which the aluminum salt comprises aluminum chloride.

JERRY A. PIERCE.

REFERENCES CITED

The following references are of record in the file of this patent:

UNITED STATES PATENTS

| Number | Name | Date |
| --- | --- | --- |
| 1,077,950 | Arsem | Nov. 4, 1913 |
| 1,506,118 | Govers | Aug. 26, 1924 |
| 1,751,955 | Stoewener | Mar. 25, 1930 |
| 1,755,496 | Behrman | Apr. 22, 1930 |
| 1,843,576 | McClure | Feb. 2, 1932 |
| 2,085,129 | Stoewener | June 29, 1937 |
| 2,232,727 | Peterkin | Feb. 25, 1941 |
| 2,284,248 | Baker et al. | May 26, 1942 |
| 2,302,297 | Connolly | Nov. 17, 1942 |
| 2,384,455 | Daley et al. | Sept. 11, 1945 |
| 2,384,946 | Marisic | Sept. 18, 1945 |
| 2,435,379 | Archibald | Feb. 3, 1948 |
| 2,450,394 | Brown et al. | Sept. 28, 1948 |

FOREIGN PATENTS

| Number | Country | Date |
| --- | --- | --- |
| 55,553 | Russia | Nov. 4, 1938 |